United States Patent
Runde et al.

(10) Patent No.: US 6,319,164 B1
(45) Date of Patent: Nov. 20, 2001

(54) ELECTRO-HYDRAULIC CONTROL WITH A MANUAL SELECTION VALVE

(75) Inventors: Jeffrey Kurt Runde, Fishers; Phillip Franklin Mc Cauley, Zionsville; Charles Francis Long, Pittsboro, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/577,029

(22) Filed: May 23, 2000

(51) Int. Cl.[7] .................................................. F16H 31/00
(52) U.S. Cl. .......................... 475/116; 475/118; 475/120; 477/130
(58) Field of Search .................................. 477/130, 131; 475/116, 118, 120

(56) References Cited

U.S. PATENT DOCUMENTS

| | | | |
|---|---|---|---|
| 4,070,927 | 1/1978 | Polak | 74/765 |
| 5,389,046 | * 2/1995 | Timte et al. | 475/127 |
| 5,601,506 | 2/1997 | Long et al. | 475/120 |
| 5,616,093 | 4/1997 | Long et al. | 475/120 |
| 5,643,125 | 7/1997 | Long et al. | 475/127 |
| 5,803,866 | * 9/1998 | Tsukamoto et al. | 477/132 |

* cited by examiner

Primary Examiner—Sherry Estremsky
Assistant Examiner—Tisha D. Lewis
(74) Attorney, Agent, or Firm—Leslie C. Hodges

(57) ABSTRACT

A power transmission includes a plurality of torque transmitting mechanisms controlled by an electro-hydraulic control system to provide a reverse drive ratio, a neutral condition and a plurality of forward drive ratios. The electro-hydraulic control has three shift valves, two variable pressure control valves, and a manual control valve. Each of the shift valves have a hydraulically on position, established by a respective solenoid valve, and a hydraulically off position, established by a spring. The manual control valve is moveable to a neutral condition, a reverse drive condition and a forward drive condition. In each of the positions during a neutral to reverse, neutral to forward, or forward/reverse interchange, the shift valves are conditioned to be hydraulically on thereby permitting the manual control valve to be the controlling valve member for completing the interchange. When the reverse ratio is established, the manual control valve directs fluid pressure from one of the variable pressure control valves to one of the shift valves to assist the respective spring and urge the shift valve to the hydraulically off position. During the reverse ratio, neutral condition and the first forward ratio one of the torque transmitting mechanisms is continually engaged.

3 Claims, 4 Drawing Sheets

ELECTRO-HYDRAULIC CONTROL WITH A MANUAL SELECTION VALVE

TECHNICAL FIELD

This invention relates to electro-hydraulic controls for a power transmission and more particularly to hydraulic controls having a manual control valve for selecting transmission drive conditions.

BACKGROUND OF THE INVENTION

Electro-hydraulic control systems employed in automatic transmissions can operate with or without a manual selector valve. Traditionally the most common practice is to use a manual selector valve that is manipulated by the operator to perform "garage shifts". Garage shifts are the valve manipulations performed when the vehicle is at rest. These garage shifts include reverse to neutral, neutral to reverse, neutral to forward drive, forward drive to neutral, reverse to forward drive, and forward drive to reverse. However in many of the current automatic transmissions having electro-hydraulic control systems, the garage shifts to reverse and drive are controlled by the electronic control unit (ECU) which enforces the manipulation of solenoid control valves to ensure the proper positioning of the shift valves or relay valves which control the distribution of hydraulic fluid to and from the torque transmitting mechanisms (clutches and brakes) in the transmission. The garage shifts into neutral continue to be controlled by the manual control valve.

The more current automatic transmissions, especially those used in heavy trucks, have increased the number of forward speed ratios to improve performance and efficiency of these vehicles. However, to conserve space in the powertrain, the transmissions utilize as few torque transmitting mechanisms as possible. One such transmission is described in U.S. Pat. No. 4,070,927 issued to Polak and assigned to the assignee of this application. The Polak gear scheme reuses the torque transmitting mechanisms to control three simple planetary gear sets to produce six forward speeds. For example, one of the torque transmitting mechanisms is engaged during the reverse, third and fifth ratios, another torque transmitting mechanism is engaged in both the second and sixth forward ratios, and yet another torque transmitting mechanism is engaged in both the reverse ratio and the first forward ratio. When this gearing arrangement is used to provide a five speed transmission, only two of the torque transmitting mechanisms are reused. The reuse of the torque transmitting mechanisms requires that the electro-hydraulic control be sufficiently flexible to provide the proper operation of these devices. Two such electro-hydraulic controls are described in U.S. Pat. Nos. 5,601,506 and 5,616,093 both of which were issued to Long et al. and assigned to the assignee of this application. These controls will operate equally well for both a five speed and a six speed transmission.

SUMMARY OF THE INVENTION

It is an object of the present invention to provide an improved electro-hydraulic control system for an automatic transmission.

In one aspect of the present invention, the electro-hydraulic control has three solenoid actuated, spring return shift valves for distributing hydraulic fluid during the operation of the transmission and the hydraulic logic of the electro-hydraulic control requires the hydraulic fluid to flow through the manual control valve during reverse operation thereby giving the operator control of the neutral-reverse garage shift. In another aspect of the present invention, the hydraulic logic overrides the electronic logic during reverse to ensure one of the shift valves is in a spring set condition. In yet another aspect of the present invention, the offgoing torque transmitting mechanism, during a reverse to neutral interchange, is exhausted through a flow restricted passage and the one shift valve.

In still another aspect of the present invention, all three of the shift valves have a solenoid controlled hydraulic signal imposed thereon during the reverse drive, the neutral condition, and the first forward ratio. In a further aspect of the present invention, an alternate reverse engagement control circuit is provided in the event of an electrical or mechanical malfunction of the solenoid controlled shift valves. In a yet further aspect of the present invention, the hydraulic logic requires hydraulic fluid flow through the manual control valve during the first forward drive condition to provide the operator with more complete selection of the forward drive operation.

DESCRIPTION OF THE PREFERRED EMBODIMENT

Figure 1:
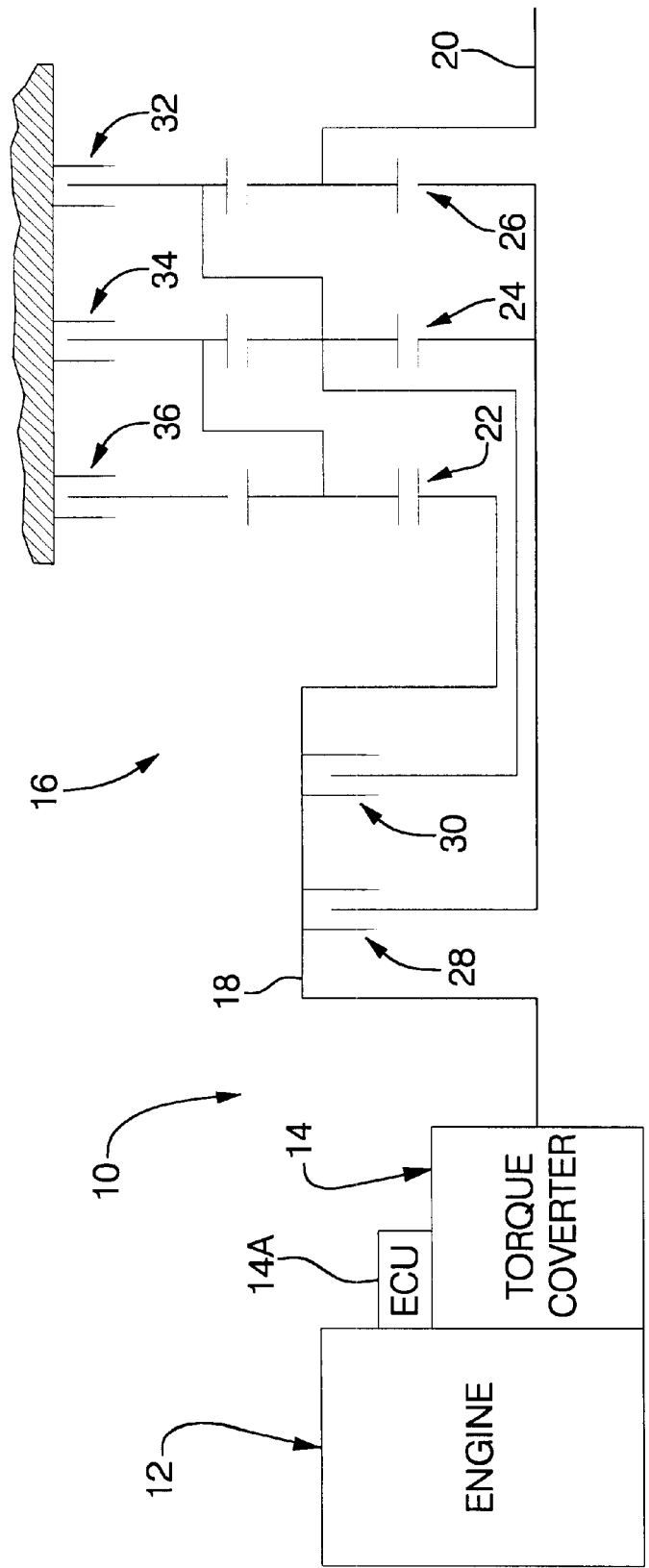
FIG. 1 is a schematic representation of a powertrain incorporating the present invention.

A powertrain 10, shown in FIG. 1, includes an engine 12, a torque converter 14, electro-hydraulic controls 14A, and a multi-speed transmission 16. The engine 12 is a conventional device. The torque converter 14 includes a conventional torque converter and clutch. The electro-hydraulic control 14 includes a hydraulic control portion that includes the present invention and an electronic control unit (ECU) that includes a conventional programmable digital computer. The ECU receives signals from a plurality of sensors, not shown, and issues control commands to various elements in the powertrain 10. The signals utilized by the ECU may include engine speed, torque converter output speed, transmission output speed, hydraulic fluid pressures in the transmission 16 and a torque proportional various torque levels in the powertrain 10.

The transmission 16 is preferably constructed in accordance with the transmission described in U.S. Pat. No. 4,070,927 issued to Polak and assigned to the assignee of the present invention. The transmission 16 includes an input shaft 18, an output shaft 20, three simple planetary gear sets 22, 24, and 26, two rotating torque transmitting mechanisms 28, and 30, and three stationary torque transmitting mechanisms 32, 34, and 36. The torque transmitting mechanisms are selectively engaged in pairs, by hydraulic commands from the electro-hydraulic control 14, to provide a plurality of forward drive ratios and one reverse drive ratio. The torque transmitting mechanism 32 is engaged during a neutral condition in the transmission 16.

The reverse drive ratio is established with the engagement of the stationary torque transmitting mechanism 36; the torque transmitting mechanism 32 was engaged during the neutral condition. The first forward drive ratio is established with the engagement of the torque transmitting mechanism 28; the torque transmitting mechanism 32 was engaged during the neutral condition. Therefore on a garage shift from neutral to the reverse drive ratio or from neutral to the first forward drive ratio only one torque transmitting mechanism is engaged to complete the interchange. The same is true on a first to reverse and a reverse to first interchange. This interchange is made with the swapping of the torque transmitting mechanisms 36 and 28.

The first to second forward drive ratio interchange is completed with the synchronized disengagement of the torque transmitting mechanism 32 and the engagement of the torque transmitting mechanism 34 while the torque transmitting mechanism 28 remains engaged. The second to third forward drive ratio interchange is completed with the synchronized disengagement of the torque transmitting mechanism 34 and the engagement of the torque transmitting mechanism 36; the torque transmitting mechanism 28 remains engaged. The third to fourth forward drive ratio interchange is completed with the synchronized disengagement of the torque transmitting mechanism 36 and the engagement of the torque transmitting mechanism 30; the torque transmitting mechanism 28 remains engaged. The fourth to fifth forward drive ratio interchange is completed with the synchronous disengagement of the torque transmitting mechanism 28 and the engagement of the torque transmitting mechanism 36; the torque transmitting mechanism 30 remains engaged. A fifth to sixth forward drive ratio interchange is also possible with the synchronous engagement of the torque transmitting mechanism 34 and the disengagement of the torque transmitting mechanism 36; the torque transmitting mechanism 30 remains engaged. The sixth ratio is not utilized with the present invention so that the control 14A can provide improved pressure regulation during the fifth forward ratio.

A portion of the electro-hydraulic control 14A is shown in FIGS. 1 through 4. The control includes a manual control valve 38, three shift valves 40, 42, 44, a torque converter clutch (TCC) valve 46, an exhaust pressure control valve 48. The control 14A also has a pressure source 50, which includes a pump and pressure controls, not shown, that supplies fluid pressure to operate the various mechanisms in the transmission 16. The pressure source 50 also feeds pressurized fluid to a conventional pressure control valve 52 that in turn supplies a filtered and controlled main pressure to a first variable pressure solenoid valve 54, which is in fluid communication with the shift valve 40, a second variable pressure solenoid valve 56, which is in fluid communication with the shift valve 42, and a plurality of conventional off-on solenoid valves 58, 60, 62 and 64 that are in fluid communication with the shift valve 40, shift valve 42, shift valve 44 and the TCC valve 46 respectively. The shift valve 42 is in fluid communication with both of the torque transmitting mechanisms 32 and 36 and the shift valve 44 is in fluid communication with the torque transmitting mechanism 34. The variable pressure solenoid valves 56 and 54 are conventional variable pressure output mechanisms such as those described in U.S. Pat. No. 5,643,125 issued to Long et al. on Jul. 7, 1997 and assigned to the assignee of this application. The variable pressure solenoid valve 54 is a normally open solenoid valve such that the pressure output is minimum (approximately zero) when the electronic signal thereto is minimum while the variable pressure solenoid valve 56 is a normally closed solenoid valve such that the pressure output thereof is at maximum (pressure output of valve 54) when the electronic signal thereto is minimum.

The pressure source 50 is in fluid communication with the shift valve 44 and the TCC valve 46 through a main passage 66. The shift valve 44 is in fluid communication with the manual control valve 38 through a passage 68, the shift valve 42 through passages 70, 72 and 74, the shift valve 40 through passages 76, 78, and 80, and a pressure switch 82 through a passage 84. The pressure switch 82 and passage 84 are also in fluid communication with the control valve 52 through a plurality of restrictions 86. The shift valve 42 is in fluid communication with the manual control valve 38, the exhaust control valve 48, the TCC valve 46 and the shift valve 40 through a passage 88.

The shift valve 42 is also connected with the manual control valve 38 through a passage 90, the shift valve 40 through a passage 92, the TCC valve 46 through the passage 94, a pressure switch 96 through a passage 98, and the manual control valve 38, and the TCC valve 46 through a passage 100. The shift valves 42 and 44 are interconnected through a passage 102 which is also connected with the solenoid valve 60. The pressure switch 96 is in fluid communication with the valve 52 through a plurality of restrictions 104.

The shift valve 40 is in fluid communication with a switch 108 and with the control pressure valve 52. The manual control valve 38 is in fluid communication with a switch 110 through a passage 112 which is also in fluid communication with the control pressure valve 52 through a plurality of restrictions 114. The manual control valve 38 is also in fluid communication with the torque transmitting mechanisms 28 and 30 through respective passages 116 and 118. The TCC valve 46 and the shift valve 40 are interconnected for fluid communication via passage 120.

The shift valve 40 has a valve spool 122, slidably disposed in a valve bore 124 and cooperating therewith to form a pressure chamber 126 that is connected with the solenoid valve 58 and a spring chamber 128 that houses a spring 130. When the chamber 126 is pressurized, the valve spool 122 is urged to a pressure set or hydraulically on position and when the chamber 126 is exhausted, the spring 130 urges the valve spool 122 to a spring set or hydraulically off position.

The shift valve 42 has a valve spool 132, slidably disposed in a valve bore 134 and cooperating therewith to form a pressure chamber 136 that is connected with the solenoid valve 60 and a spring chamber 138 that houses a spring 140. When the chamber 136 is pressurized, the valve spool 132 is urged to a pressure set or hydraulically on position and when the chamber 136 is exhausted, the spring 140 urges the valve spool 132 to a spring set or hydraulically off position.

The shift valve 44 has a valve spool 142, slidably disposed in a valve bore 144 and cooperating therewith to form a pressure chamber 146 that is connected with the solenoid valve 62 and a spring chamber 148 that houses a spring 150. When the chamber 146 is pressurized, the valve spool 142 is urged to a pressure set or hydraulically on position and when the chamber 146 is exhausted, the spring 150 urges the valve spool 142 to a spring set or hydraulically off position.

Figure 2:
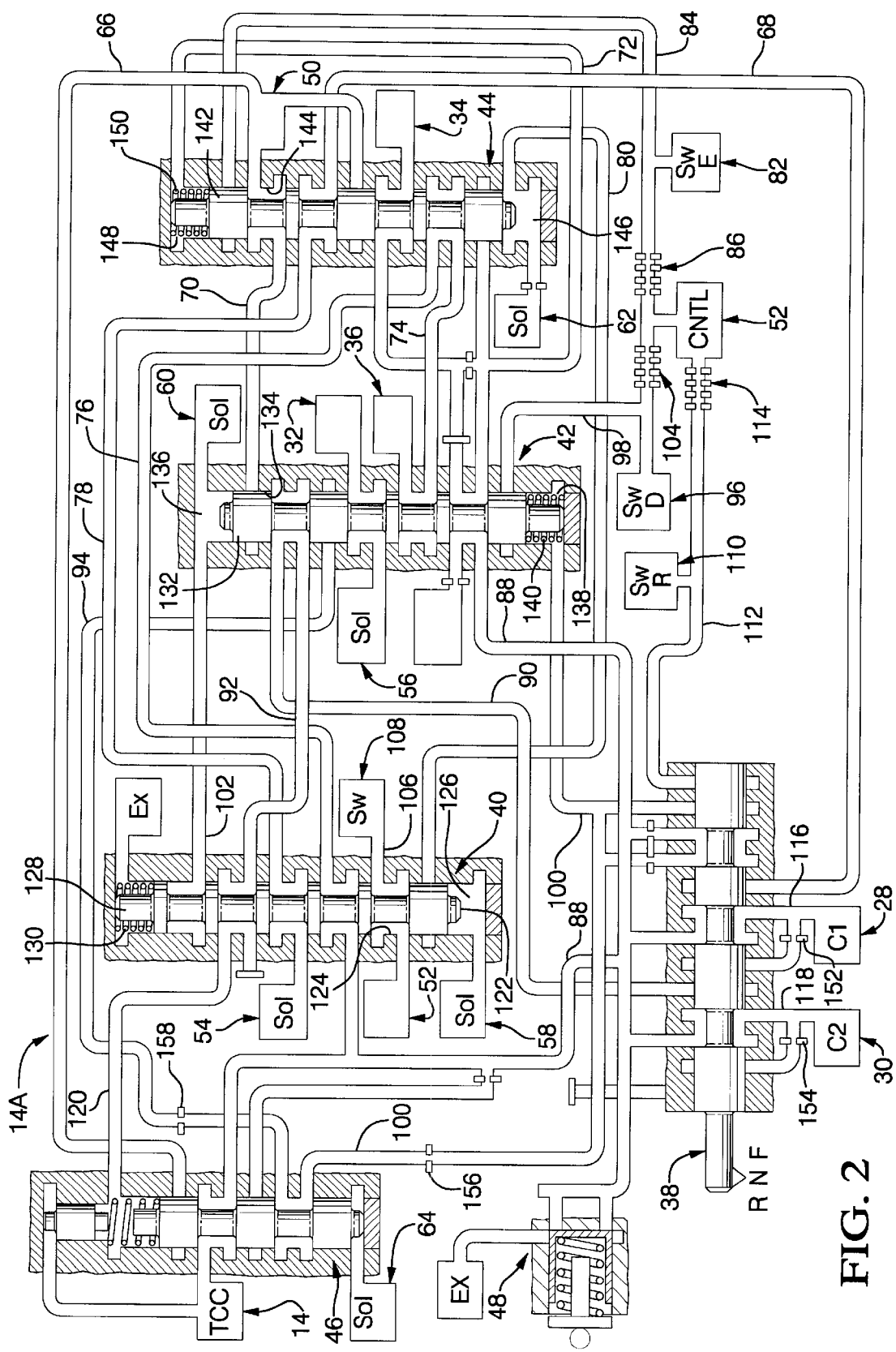
FIG. 2 is a diagrammatic representation of an electro-hydraulic control system, shown in a neutral condition, incorporating the present invention.

FIG. 2 depicts the electro-hydraulic control 14A in the neutral condition, that is the manual control valve 38 is in the neutral (N) position. All of the solenoid valves 58, 60, and 62 are electrically on and the shift valves 40, 42, and 44 are in the hydraulically on condition. The variable pressure solenoid valve 56 is communicating with the torque transmitting mechanism 32 through the shift valve 42 and supplying pressure thereto the complete the engagement thereof. All of the other torque transmitting mechanisms are disengaged. The manual control valve 38 closes the passages 90, 100, and 112, and exhausts the torque transmitting mechanisms 30 and 28 through the exhaust control valve 48. The switches 82, 96, 108 and 110 are all pressurized to indicate to the ECU that the electro-hydraulic control is in the neutral condition.

Figure 3:
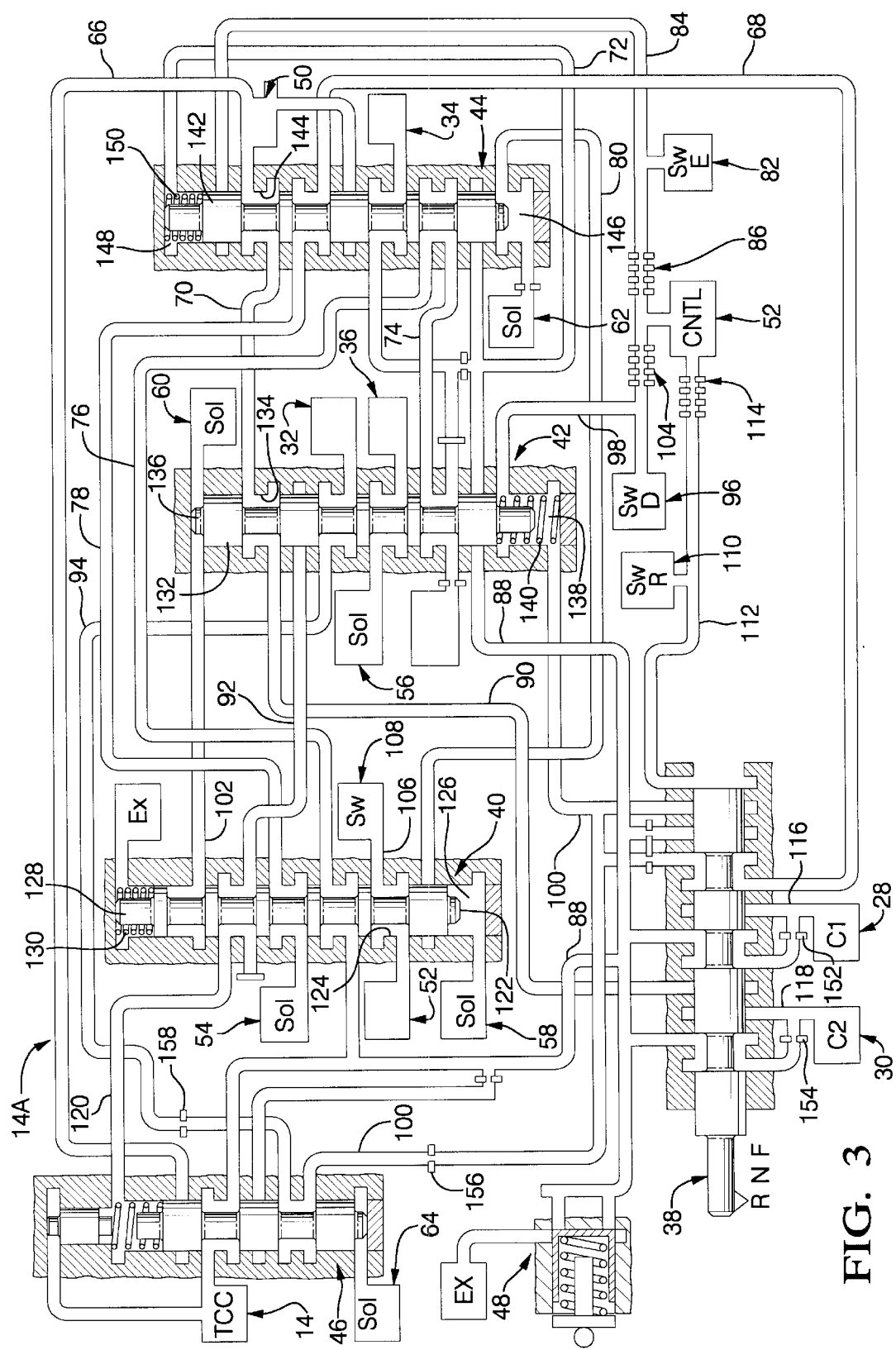
FIG. 3 is a diagrammatic representation of an electro-hydraulic control system, shown in reverse ratio selection, incorporating the present invention.

FIG. 3 depicts the electro-hydraulic control 14A with the manual control valve 38 in the reverse condition (R). In this condition, the manual control valve 38 exhausts the torque transmitting mechanisms 28 and 30 through respective orifices or restrictions in passage 152 and 154, connects the passage 100 with the passage 68, and exhausts the passage 112. With the passage 112 exhausted, the switch 110 is exhausted to inform the ECU that the manual control valve 38 has achieved the reverse condition. The shift valve 40 connects the variable pressure solenoid valve 54 with the passage 78 which connects with the passage 68 through the shift valve 44. The passage 68 is connected through the manual control valve 38 with the passage 100 which is connected with the spring chamber 146 of the shift valve 42 to force the valve spool 132 to the spring set position. The pressure in the spring chamber 138 and the force of the spring 140 will impose a greater force on the valve spool 132 that the pressure in the pressure chamber 136.

Thus on a neutral to reverse shift, the solenoids 58, 60, and 62 remain electrically on and the chambers 126, 136, and 146 remain pressurized. The passage 100 is also connected through a restriction 156 with the TCC valve 46 which is connected through a restriction 158 with the passage 94 that connects through the shift valve 42, in the spring set position, with the torque transmitting mechanism 32. Until the shift valve 42 reaches the spring set position, the passage 94 is closed by the valve spool 132. Also in the spring set position, the shift valve 42 connects the variable pressure solenoid valve 56 with the torque transmitting mechanism 36 which is engaged thereby. The restrictions 156 and 158 tend to slow the pressure rise in the passage 94 and therefore the torque transmitting mechanism 32. The reverse drive ratio is establish in the transmission 16, as explained previously, by the engagement of the torque transmitting mechanisms 32 and 36. It will be now apparent that, during normal operation, the reverse drive ratio is established and controlled by positioning of the manual control valve.

A shift to the neutral condition occurs by simply exhausting the passage 100 through the manual control valve. If the shift valve 40 becomes stuck in the hydraulically off condition and either or both of the shift valves 42 and 44 are stuck in the hydraulically on position by the system logic in the ECU, the reverse range can still be attained. With the manual control valve 38 in the neutral position, the torque transmitting mechanism 32 is controlled by the variable pressure solenoid valve 56 and the torque transmitting mechanism 36 is connected to the variable pressure solenoid valve 54 through the shift valve 40, the passage 76, the shift valve 44, the passage 74 and the shift valve 42. The ECU will control the pressure output of the variable pressure solenoids 54 and 56 to properly engage the reverse ratio for limp home operation.

Figure 4:
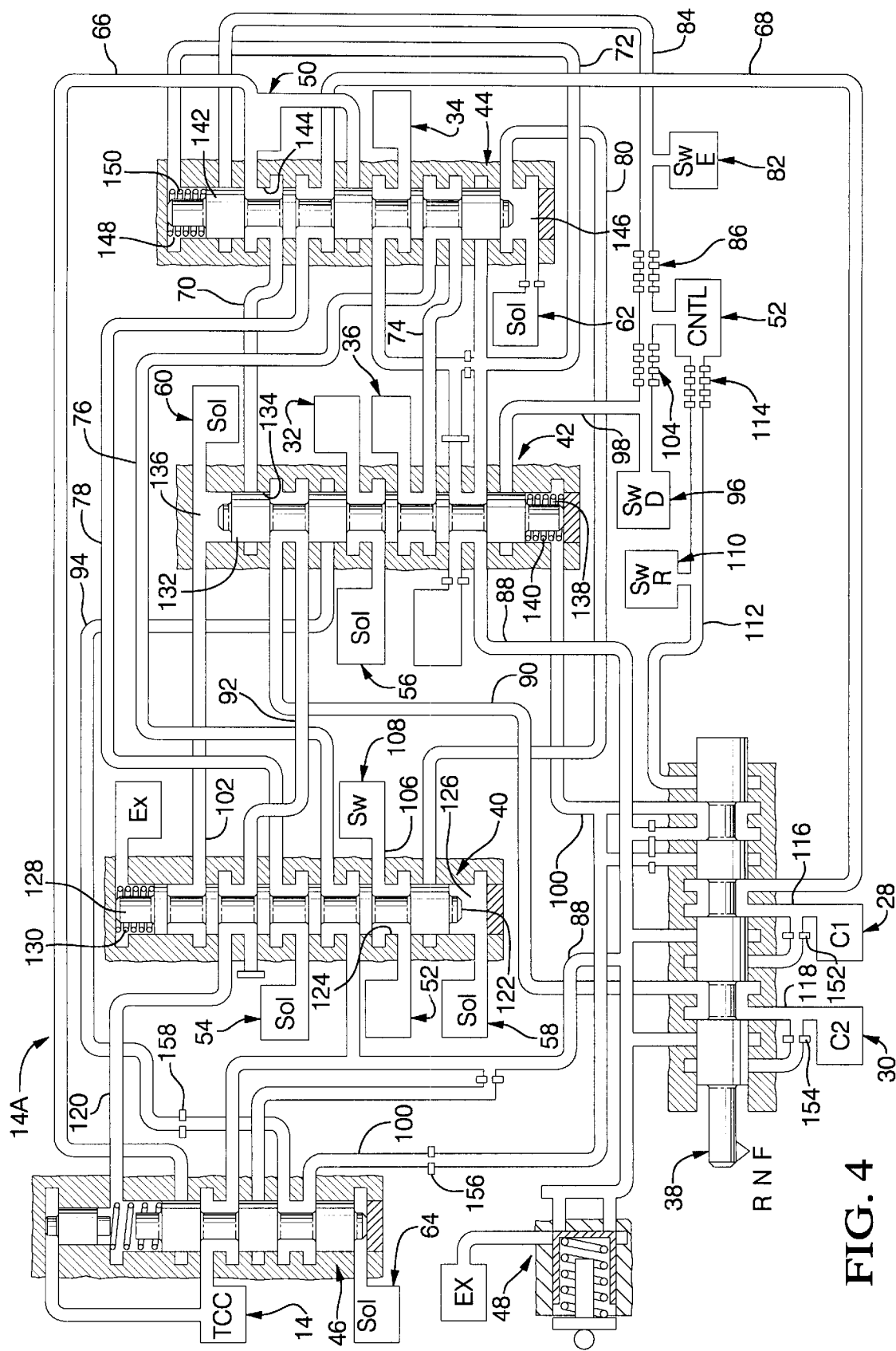
FIG. 4 is a diagrammatic representation of an electro-hydraulic control system, shown in first ratio forward drive selection, incorporating the present invention.

FIG. 4 depicts the electro-hydraulic control conditioned for the first forward drive ratio with the manual control valve 38 moved to the forward (F) position. The shift valves 40, 42 and 44 are all in the hydraulically on condition during the shift from neutral to first interchange. The torque transmitting mechanism 32 is controlled by the output pressure from the variable pressure solenoid valve 56. The output pressure from the variable pressure solenoid valve 54 is directed through the shift valve to the passage 78 to the shift valve 44, through the shift valve 44 to the passage 68 to the manual control valve 38, and through the manual control valve 38 to the torque transmitting mechanism 28. The engagement of the torque transmitting mechanism 28 is, therefore, controlled by the output pressure of the variable pressure solenoid valve 54. The neutral condition can be attained by simply moving the manual control valve 38 to the neutral condition. This gives the operator control over the neutral/forward interchange.

In preparation for a first to second interchange, the shift valves 40 and 44 are conditioned to the hydraulically off condition. In this condition, the fluid pressure from the pressure source 50 is directed through the shift valve 44 to the passage 68, which is connected with the manual control valve 38, for delivery to the torque transmitting mechanism 28. It should be noted that the movement of the shift valve 44 at this stage merely interchanges passage 68 from passage 78 to the pressure source 50. Also, the switch 82 is exhausted through the passage 84 and the spring chamber 148 to inform the ECU that the hydraulic valves are conditioned to permit a first to second interchange when required by the operating parameters of the vehicle.

From the above description, it will be apparent to those skilled in the art that the present invention permits the selection of neutral, reverse, and first forward drive conditions and interchanges therebetween with only the manual control valve being manipulated, and that the forward and reverse conditions are not achieved otherwise unless required by a malfunction, such as a stuck valve or electric power discontinuance.

What is claimed is:

1. An electro-hydraulic control for a transmission having a plurality of torque transmitting mechanisms for controlling the establishment of a reverse drive ratio, a neutral condition, and a plurality of forward drive ratios, said electro-hydraulic control comprising:

a source of fluid pressure;

first and second variable pressure solenoid valves that are controllable to establish variable output pressures;

first, second, and third shift valves each having a control solenoid valve and a pressure chamber to urge the respective shift valve to a hydraulically on position when said respective control solenoid valve issues a pressure signal, and a spring member to urge each respective shift valve to a hydraulically off position when said respective control solenoid valve is not issuing a pressure signal, said first variable pressure solenoid valve being in continuous fluid communication with said first shift valve, and said second variable pressure solenoid valve being in continuous fluid communication with said second shift valve;

a manual control valve moveable by an operator to a reverse position, a neutral position, and a forward position;

said control solenoid valves each issuing a pressure signal to the respective shift valves to urge said shift valves to said hydraulically on position when said manual control valve is in said neutral condition and a first of the torque transmitting mechanisms being engaged by fluid pressure from said second variable pressure solenoid valve;

said second shift valve having a pressure signal imposed thereon from said first variable pressure solenoid valve via said third shift valve and said manual control valve to assist said spring to urge said second shift valve to said hydraulically off position when said manual control valve is moved to said reverse position and to interchange the fluid pressure at the first torque transmitting mechanism from said first variable pressure solenoid valve to said second variable pressure solenoid valve and said first variable pressure solenoid valve being connected with a second of said torque transmitting mechanisms by a fluid flow path sequentially including said first shift valve, said third shift valve, said manual control valve, and said second shift valve when said manual control valve is in said reverse position and all of said control solenoid valves are issuing a pressure signal;

said manual control valve being operable when moved from said reverse position to exhaust said pressure signal assisting said spring of said second shift valve; and said manual control valve being operable, when moved to said forward position, to connect said first variable pressure solenoid valve with a third of said torque transmitting mechanisms via said first shift valve, said third shift valve and said manual control valve.

2. An electro-hydraulic control for a transmission having a plurality of torque transmitting mechanisms for controlling the establishment of a reverse drive ratio, a neutral condition, and a plurality of forward drive ratios, said electro-hydraulic control comprising:

a source of pressure;

a manual control valve selectively moveable to forward, neutral, and reverse positions;

first, second, and third shift valves each having a solenoid valve to provide an on pressure to the respective shift valve for movement to a hydraulically on position, and each having a spring for urging the respective shift valve to a hydraulically off position when pressure from said respective solenoid valves is not present, all of said shift valves being pressurized by said respective solenoid valves during the reverse drive ratio, the neutral condition, and a first of the forward ratios;

a first variable pressure solenoid valve communicating a first fluid pressure therefrom to said first shift valve;

a second variable pressure solenoid valve communicating a second fluid pressure therefrom to said second shift valve;

said variable pressure solenoid valves and said third shift valve being continuously connected with said pressure source;

first passage means for communicating said first fluid pressure through said first shift valve to said third shift valve when said first shift valve is in said hydraulically on position;

second passage means for connecting said first fluid pressure to said manual control valve when both of said first and third shift valves are in said hydraulically on position;

third passage means for communicating said first fluid pressure from said manual control valve to said second shift valve to assist said spring to urge said second shift valve to said hydraulically off position regardless of the on pressure from the respective solenoid valve, said third passage means also communicating said first fluid pressure from said manual control valve to said second shift valve when said manual control valve is in said reverse position, said manual control valve communicating said third passage means to an exhaust when said manual control valve is in said neutral and forward positions;

fourth passage means for communicating said first fluid pressure from said manual control valve to a first of said torque transmitting mechanisms when said manual control valve is in said forward position and for communicating with exhaust when said manual control valve is in said reverse and neutral positions;

fifth passage means for communicating said first fluid pressure from said second shift valve means to a second of said torque transmitting mechanisms when said second shift valve is in said hydraulically off position and said manual control valve is in said reverse position, and for communicating said second fluid pressure from said second shift valve to said second torque transmitting mechanism when said second shift valve is in said hydraulically on position and said manual control valve is in either said neutral of forward position; and sixth passage means for communicating said second fluid pressure to a third of said torque transmitting mechanisms when said second shift valve is in said hydraulically off position.

3. An electro-hydraulic control for providing engagement pressure to a plurality of torque transmitting mechanisms in a power transmission to establish a plurality of forward drives, a reverse drive, and a neutral condition therein, said electro-hydraulic control comprising:

a pressure source distributing hydraulic fluid pressure;

a manual valve manipulable by an operator between neutral, forward, and reverse positions;

first variable pressure valve means in continuous fluid communication with said pressure source for providing a first engagement pressure;

second variable pressure valve means in continuous fluid communication with said pressure source for providing a second engagement pressure;

a first shift valve having a valve spool, a control chamber connected with said spool valve and being selectively pressurized to urge said valve spool to a pressure set position, a spring chamber connected with said valve spool, and a spring disposed in said spring chamber and being in contact with said valve spool for imposing a force thereon to urge said valve spool to a spring set position, said first shift valve being in continuous communication with said first engagement pressure for distribution thereof;

a second shift valve having a valve spool, a control chamber connected with said spool valve and being selectively pressurized to urge said valve spool to a pressure set position, a spring chamber connected with said valve spool, and a spring disposed in said spring chamber and being in contact with said valve spool for imposing a force thereon to urge said valve spool to a spring set position, said second shift valve being in continuous communication with said second engagement pressure for distribution thereof;

a third shift valve having a valve spool, a control chamber connected with said spool valve and being selectively pressurized to urge said valve spool to a pressure set position, a spring chamber connected with said valve spool, and a spring disposed in said spring chamber and being in contact with said valve spool for imposing a force thereon to urge said valve spool to a spring set position;

first, second, and third solenoid control valve means for selectively supplying pressurized hydraulic fluid from said pressure source to said control chambers on said first, second, and third shift valves during the reverse drive, the neutral condition, and a first of the forward drives;

passage means for communicating said first engagement pressure from said first shift valve through said third shift valve and said manual valve to said spring chamber on said second shift valve to move said valve spool of said second shift valve to said spring set position regardless of the fluid pressure in said control chamber of said second shift valve and for communicating said first engagement pressure to a first of said torque transmitting mechanisms sequentially by way of said manual valve and second shift valve when said manual valve is in said reverse position, for distributing said first engagement pressure to a second of said torque transmitting mechanisms by way of said first shift valve, said third shift valve and said manual valve, for distributing said second engagement pressure to the first of said torque transmitting mechanisms through said second shift valve when said manual valve is in said neutral or forward position and to a third of said torque transmitting mechanisms when said manual valve is in said reverse position.

* * * * *